United States Patent
Radosavljevic et al.

[15] 3,670,958
[45] June 20, 1972

[54] SLIDE RULE

[72] Inventors: Svetislav M. Radosavljevic, 9807 South Seely Avenue, Chicago, Ill. 60643; John Manlotes, 1637 Holly Lane, Munster, Ind. 46321

[22] Filed: June 17, 1970

[21] Appl. No.: 47,006

[52] U.S. Cl. ........................... 235/70 A, 235/61 A, 35/30, 35/31 E
[51] Int. Cl. ......................................... G06g 1/02, G09b 19/02
[58] Field of Search ..................... 235/70, 70 A, 61 A, 79.5; 35/31 E, 39, 30

[56] References Cited

UNITED STATES PATENTS 1,581,567  4/1926  Eshbaugh ........................... 235/70 A
3,071,320  1/1963  Scott ................................... 235/61 A
3,332,156  7/1967  Reeves ..................................... 35/30
3,461,572  8/1969  Schmidt et al ........................ 35/31 E

*Primary Examiner*—Stephen J. Tomsky
*Attorney*—Richard G. Kinney

[57] ABSTRACT

A mechanical analog computing device of the slide rule type is disclosed wherein the multiplication and/or division of numbers from an other than decimal number system (e.g., binary, octal, duodecimal, and hexadecimal) may be performed by combined operations in progressive manipulations. The disclosed device includes a slide and body upon which scales are graduated in accordance with the logarithm to the other than decimal base concerned. This device can be also used for finding the reciprocal or inverse of numbers from the other than decimal numeral system.

8 Claims, 4 Drawing Figures

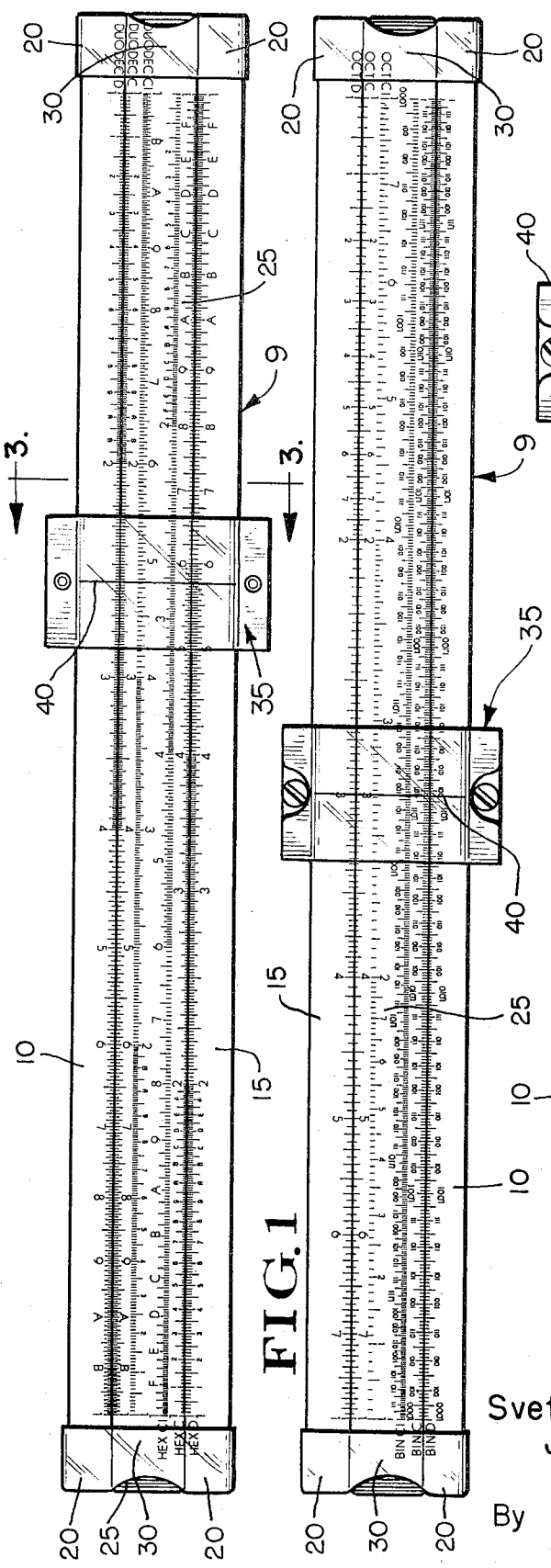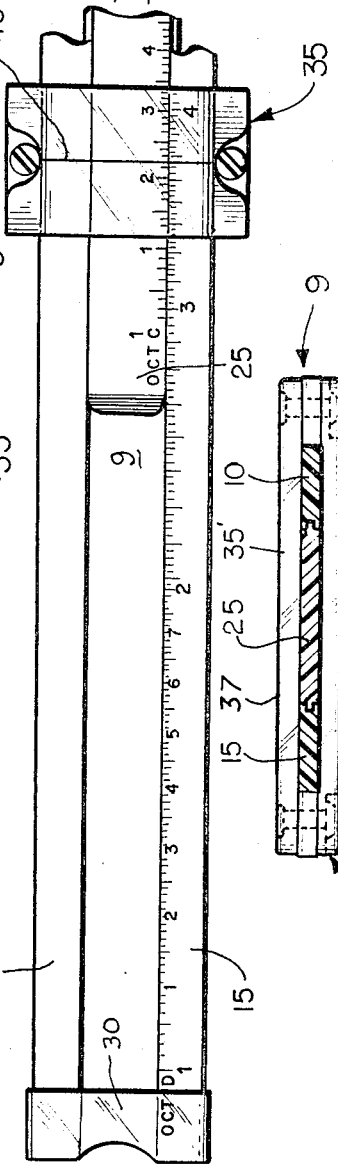

3,670,958

SLIDE RULE

FIELD OF THE INVENTION

The present invention relates to a new and improved slide rule which is of special utility in facilitating rapid and error free computations involving the multiplication, division, and the reciprocal (or inverse) of numbers in other than decimal number systems e.g., Binary (Base 2), Octal (Base 8), Duodecimal (Base 12) or Hexadecimal (Base 16). The present invention may also find use as a teaching device or visual aid in teaching binary, octal, duodecimal, and hexadecimal arithmetic relationships.

BACKGROUND OF THE INVENTION

Slide rules have come into general use by engineers, technicians, students, and others who are interested in carrying out calculations of some complexity. Although some crude approaches to the common slide rule are dated as early as the 17th century, it was not until 1859, when Mannheim developed the slide rule that bears his name, that such instruments started to come into general use.

Despite the general usefulness of present day slide rules, they are subject to one distinct drawback in that computations can only be performed in the decimal (Base 10) number system. In dealing with electronic digital computers and related data processing equipment, computations are performed by such machines using the binary number system and data or results are either inputted or outputted to or from these machines either in the binary, octal, or hexadecimal number systems. Present day slide rules cannot perform computations in the aforementioned number systems and, hence, have limited value in electronic data processing.

It is thus one object of the present invention to provide a new and improved slide rule that overcomes the aforementioned disadvantage of the ordinary slide rule. The present invention is essentially concerned in obtaining the numerical values resulting from the multiplication and/or division of numbers in an other than decimal number system and especially in the binary, octal, duodecimal, and hexadecimal number systems. It can be also used, but is not limited thereto, for obtaining the reciprocal or inverse of a number in the aforementioned number systems.

In teaching multiplication in various numeral systems, one method of introducing this concept in beginning data processing or computer mathematics courses is to construct a multiplication table that stores the results of multiplying the coefficients of the system by each other. By using the rules for multiplication in conjunction with a multiplication table it is possible to slowly arrive at the product of a series of numbers. The present invention allows the student and/or instructor to manipulate this device in the conventional slide rule fashion and to arrive easily and quickly, without the use of multiplication tables, at the solution of problems requiring the product, quotient, or reciprocal, which ever the case may be, in the binary, octal, duodecimal, and hexadecimal number system, respectively.

This device can be applied to the solution of many problems that occur frequently in the teaching of courses in computer science/technology and the application of technological principles in practice. In other words, the device has rendered the solution of many problems of interest in instruction and application of computer arithmetic simple to perform and understand, and the answers required can be quickly obtained with a minimum of effort.

Thus, an objective of this invention is to provide a mechanical device for the easy, quick, and accurate determination of computations involving multiplication, division, and the reciprocal of numbers in the binary, octal, duodecimal, and hexadecimal number systems, respectively. Another objective is to provide a mechanical device with which a student can easily understand the meaning of the binary, octal, duodecimal, and hexadecimal number systems, respectively, and can easily see the full range of their variation in magnitude.

Another objective of this invention is to provide a mechanical device with which the instructor can demonstrate, to his classes, the meaning of the binary, octal, duodecimal, and hexadecimal number systems, respectively, in such a way as to clearly and simply show the student the full range of their variation in magnitude.

SUMMARY OF THE INVENTION

The present invention provides a slide rule capable of performing at least multiplication and division, in an other than decimal number system such as the binary, octal, duodecimal and/or hexadecimal number system, by means of members relatively movable with respect to each other having a scale defined on each which scale is graduated in accordance with the logarithms to the base of that non-decimal number system, including graduations for and indicia for each digits, (such as "1" for binary, 1, 2, 3, 4, 5, 6 and 7 for octal, etc.) of that base.

The scale preferably starts at an index having the indicia "1" and ends after one cycle at a second index also having the indicia "1," although as in a circular slide rule the scale might end and begin at the same index.

A reciprocal or inverse scale in which a scale aligned with the indexes of one of the above mentioned scales is graduated in accordance with the logarithm to the base of that non-decimal number system, in the opposite direction therefrom, is preferably defined on one of the members for determining the reciprocal or inverse of non-decimal numbers of the other scale.

As used herein the term "digit" will be taken as those whole numbers, excluding zero, of the base. Thus in the binary system there is only one digit: the number 1; in the octal system there are seven digits: the numbers 1, 2, 3, 4, 5, 6 and 7; in the duodecimal system there are eleven digits: 1, 2, 3, 4, 5, 6, 7, 8, 9, A and B (wherein A and B represent, respectively, the equivalent decimal numbers 10 and 11); and in the hexadecimal number system there are 15 digits: 1, 2, 3, 4, 5, 6, 7, 8, 9, A, B, C, D, E and F (wherein A, B, C, D, E and F represent, respectively the equivalent decimal numbers of 10, 11, 12, 13, 14 and 15).

The invention, together with the further advantages thereof, may best be understood by reference to the following description taken in connection with the accompanying drawings, in the several figures of which like reference numerals identify like elements.

BRIEF DESCRIPTION OF THE DRAWINGS

FIG. 1 is a plan view showing one face of the slide rule embodying the present invention;

FIG. 2 is a similar view showing the reverse face;

FIG. 3 is a sectional view as seen from the line 3—3 in FIG. 2; and

FIG. 4 is a fragmentary view on an enlarged scale showing only pertinent portions of the slide rule of FIGS. 1—3 and illustrating one typical example of its use.

As a matter of convenient reference, the face of the rule shown in FIG. 1 will hereinafter be considered to be the front face and the face shown in FIG. 2 to be the rear face.

DETAILED DESCRIPTION

Referring to FIG. 1, there is depicted an analog computing device of the slide rule type which is constructed in accordance with the principles of the present invention and is generally designated by the numeral 9. The slide rule 9 has a pair of side members 10 and 15 which are rigidly secured together by means of transparent end plates 30 which are secured thereto at 20, so that a slide member 25 may be mounted between the members 10 and 15 so as to be readily slidable longitudinally thereof. The slide member 25 has the tongue members on each edge adapted to slide in grooves formed along the adjacent edges of the side members 10 and 15. Thus the slide member 25 is held in engagement between the bars 10 and 15 in various positions such as the moved position illustrates in FIG. 3. A runner or indicator 35, having two transparent face plates 36, 37 is provided. The runner 35 may be of any usual construction. The runner 35 is mounted over the members 10, 15 and 25 so as to be readily moved into any position desired between the plates 30, and has a hairline 40 on each side thereof. An acceptable construction for the body made up of members 10 and 15, the slide 25 and the runner 35 is, for example, described in U.S. Pat. No. 1,930,852.

In accord with the present invention the rule 9 is provided with scales from 1 to 10 in an other than decimal number system. In FIG. 1, such scales are designated BIN and OCT. For the sake of brevity, the following abbreviations are used to identify other than decimal scales: in FIG. 1, BIN for binary and OCT for octal; and in FIG. 2, DUODEC for duodecimal and HEX for hexadecimal number systems. These abbreviations refer to respectively number systems of binary, octal, duodecimal, and hexadecimal.

On the front face of the rule, as shown in FIG. 1 the slide is provided with the BIN C scale which has graduated logarithmic division of full unit length from $(1)_2$ to $(10)_2$. That is, the unit length of the scale is divided into segments marked by indicia such as "1.001" which are spaced a distance from the left hand side of that length (1.000) equal to ratio of the logarithm of that number in the base (2) of the number system to the total length of the scale. The subscript 2 as used herein indicates that these are binary numbers and belong to the binary number system, i.e., 0 and 1. Immediately below the BIN C scale is the BIN D scale, which is the same as the BIN C scale and has graduated logarithmic divisions of full unit length from $(1)_2$ to $(10)_2$. Above the BIN C scale, as shown in FIG. 1, is the BIN CI scale and is a reciprocal logarithmic scale of full unit length graduated from $(10)_2$ to $(1)_2$ the same as the BIN C scale except that it is inverted. The BIN C and BIN D scales are used to determine the product or quotient of binary numbers. The BIN CI and BIN C scales are used to find the reciprocal of binary numbers. (Note that when the indices on scales BIN C and BIN D coincide, the reciprocal of binary numbers can also be found using the BIN CI and BIN D scales).

On the front face of the rule, as shown in FIG. 1, the slide is provided with the OCT C scale, of full unit length and graduated in accordance with the logarithms of numbers from $(1)_8$ to $(10)_8$ in a manner similar to that of the BIN scales. (Note the subscript 8 indicates that these are octal numbers and belong to the octal number system, i.e., 0, 1, 2, 3, 4, 5, 6, and 7). Immediately below the OCT C scale is a scale designated as OCT D which is the same as the OCT C scale and has graduated logarithmic divisions of full unit length from $(1)_8$ to $(10)_8$. Above the OCT C scale, as viewed in FIG. 1, is the scale designated as OCT CI and is a reciprocal logarithmic scale of full unit length graduated from $(10)_8$ to $(1)_8$ the same as the OCT C scale except that it is inverted. The OCT C and OCT D scales are used to determine the product or quotient of octal numbers. The OCT CI and OCT C scales are used to find the reciprocal of octal numbers. (Note that when the indices on scales OCT C and OCT D coincide, the reciprocal of octal numbers can also be found using the OCT CI and OCT D scales.)

In FIG. 1 the octal scales are, in accordance with one feature of the invention, depicted as being "upside down" with respect to the binary scales. In FIG. 2 the duodecimal scales are also depicted as being "upside down" with respect to the hexadecimal scales. This was done in order to preserve the familiar convention of the C and D scales with respect to each other as known to users of slide rules. However, this convention need not be followed and the octal scales may be represented "right side up" with respect to the binary scales, and the hexadecimal scales may be represented "right side up" with respect to the duodecimal scales.

On the rear face of the rule, as shown in FIG. 2 the slide is provided with the HEX C scale, of full unit length and graduated in accordance with the logarithms (to base 16) of numbers from $(1)_{16}$ to $(10)_{16}$. (Note the subscript 16 indicates that these are hexadecimal numbers and belong to the hexadecimal number system, i.e., 0, 1, 2, 3, 4, 5, 6, 7, 8, 9, A, B, C, D, E and F.) Immediately below the HEX C scale is a scale designated as HEX D which the same as the HEX C scale and has graduated logarithmic divisions of full unit length from $(1)_{16}$ to $(10)_{16}$. Above, the HEX C scale, as viewed in FIG. 2, is the scale designated as HEX CI and is a reciprocal logarithmic scale of full unit length graduated from $(10)_{16}$ to $(1)_{16}$ the same as the HEX C scale except that it is inverted. The HEX C and HEX D scales are used to determine the product or quotient of hexadecimal numbers. The HEX CI and HEX C scales are used to find the reciprocal of hexadecimal numbers. (Note that when the indicies on scales HEX C and HEX D coincide, the reciprocal of hexadecimal numbers can also be found using the HEX CI and HEX D scales.)

On the rear face of the rule, as shown in FIG. 2 the slide is also provided with the DUODEC C scale which has graduated logarithmic divisions of full unit length from $(1)_{12}$ to $(10)_{12}$. (Note the subscript 12 indicates that these are duodecimal numbers and belong to the duodecimal number system, i.e., 0, 1, 2, 3, 4, 5, 6, 7, 8, 9, A and B.) Immediately below the DUODEC C scale is the DUODEC D scale, which is the same as the DUODEC C scale and has graduated logarithmic divisions of full unit length from $(1)_{12}$ to $(10)_{12}$. Above the DUODEC C scale, as shown in FIG. 2, is the DUODEC CI scale and is a reciprocal logarithmic scale of full unit length graduated from $(10)_{12}$ to $(1)_{12}$ the same as the DUODEC C scale except that it is inverted. The DUODEC C and DUODEC D scales are used to determine the product or quotient of duodecimal numbers. The DUODEC CI and DUODEC C scales are used to find the reciprocal of duodecimal numbers. (Note that when the indices on scales DUODEC C and DUODEC D coincide, the reciprocal of duodecimal numbers can also be found using the DUODEC CI and DUODEC D scales.)

The scales for the duodecimal number system were included on the slide rule since this number system is used in certain parts of the world and since it is also of academic interest to those who study or teach number systems. However, in order to increase the utility of this invention, the duodecimal scales may be replaced by the conventional decimal scales, C, D, and CI, of the decimal number system as described by prior art in the slide rule field. Additional decimal scales such as the folded scales, the scales yielding squares, cubes, sines, tangents, logarithms, etc., may be provided on the slide member or body member and on the faces of these members.

For convenience of operation, the scales of the present invention are preferably arranged over a space approximately 10 inches in length, a standard length, which has proven most satisfactory in the use of slide rules.

It is well understood that in slide rules the slide may be rectilinearly movable in a slot, as herein shown, or in a channel, or the rule may be in disc or cylinder form with a rotary slide member. When in the following claims a slide member is recited, it is to be understood that it may be of any of the known types. Variations from the specific disclosure herein, for example in the relative positioning of scales, are possible and are contemplated in the claims which follow.

OPERATION

The following illustrative examples serve to demonstrate the simplicity of operation of the present rule. The values of the results obtained are slide rule values, sufficiently accurate for slide rule purposes, but are not asserted to be as accurate as would be the case if they had been worked out with an electronic digital computer or by hand using the addition and multiplication tables of the respective numeral system. The advantages arising from the various scales which pertain to the binary, octal, duodecimal, or hexadecimal number system, respectively, will be evident from the following examples.

In the following examples, for the sake of brevity, the various scales are referred to merely by their abbreviated notations such as OCT C, OCT D, etc., instead of "OCT C" scale, "OCT D" scale and the like.

The following set of examples illustrate octal multiplication, octal division, and the determination of reciprocals of octal numbers.

EXAMPLE 1
Evaluate: $(0.00273)_8 \times (12.14)_8$
Solution: Disregard the octal point and to 273 on OCT D, set the left index of OCT C. Push hairline to 1214 on OCT C. At the hairline read 356 on OCT D. This operation is illustrated in FIG. 4. To place the octal point, approximate the answer by writing $(0.003)_8 \times (10)_8 = (0.03)_8$. Hence, the answer is $(0.0356)_8$. For brevity in the drawings the positioning of the slide and runner for the remainder of these examples are not illustrated, it being understood that they are to be positioned in an analogous manner to that illustrated in FIG. 4.

EXAMPLE 2
Evaluate: $(67.5)_8 (37.7)_8$
Solution: Disregard the octal point and push the hairline to 67.5 on OCT D. Draw 37.7 of OCT C under the hairline. Opposite index of OCT C read 1575 on OCT D. The rough calculation $(70)_8 (40)_8 = (1.6)_8$ shows that the octal point must be placed after the 1.

Hence, the answer is $(1.575)_8$.

EXAMPLE 3
Evaluate: $\left(\frac{5.27}{3.15}\right)_8 = \left(\frac{4.35}{x}\right)_8 = \left(\frac{Y}{41.6}\right)_8 = \left(\frac{173.4}{z}\right)_8$ Solution: Push hairline to 527 on OCT D.
Draw 315 of OCT C under the hairline.
Opposite 435 on OCT D, read $x = (2.52)_8$ on OCT C.
Opposite 416 on OCT C, read $y = (70.3)_8$ on OCT D.
Opposite 1734 on OCT D, read $z = (111.7)_8$ on OCT C.

The positions of the octal points were determined by noticing that each denominator had to be somewhat less than twice its associated numerator because 5.27 is somewhat less than twice 3.15.

EXAMPLE 4
Find the reciprocal of: $(0.065)_8$
Solution: Draw 0.065 of OCT CI under the hairline.
Read the reciprocal $(11.52)_8$ at the hairline on the OCT C scale.
or
Draw 0.065 of OCT C under the hairline.
Read the reciprocal $(11.52)_8$ at the hairline on the OCT CI scale.

EXAMPLE 5
Evaluate: $\left[\frac{17 \times 45 \times 37}{23 \times 27}\right]_8$ Solution: Push hairline to 17 on OCT D.
Draw 23 of OCT C under the hairline.
Push hairline to 45 on OCT C.
Draw 27 of OCT C under the hairline.
Push hairline to 37 on OCT C.
At the hairline read 473 on OCT D.
To determine the position of the octal point write $$\left[\frac{20 \times 40 \times 40}{20 \times 30}\right]_8 = \text{about } (50)_8$$

Hence, the answer is $(47.3)_8$.

EXAMPLE 6
Evaluate: $(1.743 \times 72 \times 2.45 \times 0.574 \times 225)_8$
Solution: In order to solve this on the slide rule in the shortest possible way, rewrite the given expression in the form:

$$\left[\frac{1.743 \times 2.45 \times 225}{(1/72) \times (1/0.574)}\right]_8$$

Push hairline to 1743 on OCT D.
Draw 72 of OCT CI under the hairline.
Push hairline to 245 on OCT C.
Draw 574 of OCT CI under the hairline.
Push hairline to 225 on OCT C.
At the hairline read 764 on OCT D.
To approximate the answer write
$(2 \times 70 \times 3 \times 0.6 \times 200)_8 = (77,000)_8$
Hence, the answer is $(76,400)_8$.

The following set of examples illustrate hexadecimal multiplication, hexadecimal division, and the determination of reciprocals of hexadecimal numbers.

EXAMPLE 7
Evaluate: $(9.D7)_{16} \times (5.A)_{16}$
Solution: Disregard the hexadecimal point and to 9D7 on HEX D, set the right index of HEX C.
Push hairline to 5A on HEX C.
At the hairline read 376 on HEX D.
To place the hexadecimal point, approximate the answer by writing $(A)_{16} \times (6)_{16} = (3C)_{16}$.
Hence, the answer is $(37.6)_{16}$.

EXAMPLE 8
Evaluate: $(1E.D)_{16} (B.C)_{16}$
Solution: Disregard the hexadecimal point and push the hairline to 1ED on HEX D.
Draw BC of HEX C under the hairline.
Opposite index of HEX C read 29F on HEX D.
The rough calculation $(20)_{16} (C)_{16} = (2.A)_{16}$ shows that the hexadecimal point must be placed after the 2. Hence, the answer is $(2.9F)_{16}$.

EXAMPLE 9
Evaluate:
$$\left[\frac{5.27}{3.15}\right]_{16} = \left[\frac{4.35}{x}\right]_{16} = \left[\frac{y}{41.6}\right]_{16} = \left[\frac{1FA.0}{z}\right]_{16}$$

Solution: Push hairline to 527 on HEX D.
Draw 315 of HEX C under the hairline.
Opposite 435 on HEX D, read $x = (2.84)_{16}$ on HEX C. Opposite 416 on HEX C, read $y = (6D.4)_{16}$ on HEX D. Opposite 1FA0 on HEX D, read $z = (12E.0)_{16}$ on HEX C.
The positions of the hexadecimal points were determined by noticing that each denominator had to be somewhat less than twice its associated numerator because 5.27 is somewhat less than twice 3.15.

EXAMPLE 10
Find the reciprocal of: $(0.0BA)_{16}$
Solution: Draw 0.0BA of HEX CI under the hairline.
Read the reciprocal $(16.0)_{16}$ at the hairline on the HEX C scale.
or
Draw 0.0BA of HEX C under the hairline.
Read the reciprocal $(16.0)_{16}$ at the hairline on the HEX CI scale.

EXAMPLE 11
Evaluate:
$$\left[\frac{17 \times 45 \times 37}{23 \times 27}\right]_{16}$$

Solution: Push hairline to 17 on HEX D.
Draw 23 of HEX C under the hairline.
Push hairline to 45 on HEX C.
Draw 27 of HEX C under the hairline.
Push hairline to 37 on HEX C.
At the hairline read 3FF on HEX D.
To determine the position of the hexadecimal point write $$\left[\frac{20 \times 40 \times 40}{20 \times 30}\right]_{16} = \text{about } (55)_{16}$$

Hence, the answer is $(3F.F)_{16}$.

EXAMPLE 12
Evaluate: $(1.743 \times 72 \times 2.45 \times 0.574 \times 225)_{16}$
Solution: In order to solve this on the slide rule in the shortest possible way, rewrite the given expression in the form:

$$\left[\frac{1.743 \times 2.45 \times 225}{(1/72) \times (1/0.574)}\right]_{16}$$

Push hairline to 1743 on HEX D.
Draw 72 of HEX CI under the hairline.

Push hairline to 245 on HEX C.
Draw 574 of HEX CI under the hairline.
Push hairline to 225 on HEX C.
At the hairline read 112 on HEX D.
To approximate the answer write $(2 \times 70 \times 3 \times 0.6 \times 200)_{16}$
$= (1F, 000)_{16}$
Hence, the answer is $(11,200)_{16}$ The following set of examples illustrate binary multiplication, binary division, and the determination of reciprocals of binary numbers. Note that BIN C, BIN CI, and BIN D scales are each divided logarithmically into 512 parts so as to give 10 significant binary digits of accuracy.

EXAMPLE 13
Evaluate: $(1.1011)_2 \times (1.1001)_2$
Solution: To 1.1011 on BIN D, set the right index of BIN C. Push hairline to 1.1001 on BIN C. At the hairline read 1010100011 on BIN D. To place the binary point, approximate the answer by writing $(1.1)_2 \times (1.1)_2 = (10.01)_2$.
Hence, the answer is $(10.10100011)_2$.

EXAMPLE 14
Evaluate: $(10.11100)_2 (10.110)_2$
Solution: Disregard the binary point and push the hairline to 1011100 on BIN D.
Draw 10110 of BIN C under the hairline.
Opposite index of BIN C read 1000010111 on BIN D. The rough calculation $(10.1)_2 (10.1)_2 = (1.0)_2$ shows that the octal point must be placed after the first 1. Hence, the answer is $(1.000010111)_2$.

EXAMPLE 15
Evaluate:
$$\begin{bmatrix}1.100\\1.010\end{bmatrix}_2 = \begin{bmatrix}1.011\\x\end{bmatrix}_2 = \begin{bmatrix}y\\1.101\end{bmatrix}_2 = \begin{bmatrix}1.111\\z\end{bmatrix}_2$$
Solution: Push hairline to 1.100 on BIN D.
Draw 1.010 of BIN C under the hairline.
Opposite 1.011 on BIN D, read $x = (1.001001011)_2$ on BIN C. Opposite 1.101 on BIN C, read $y = (1.111100110)_2$ on BIN D.
Opposite 1.111 on BIN D, read $z = (1.100100000)_2$ on BIN C.

EXAMPLE 16
Find the reciprocal of: $(0.01010011)_2$
Solution: Draw 0.01010011 of BIN CI under the hairline.
Read the reciprocal $(11.00010101)_2$ at the hairline on the BIN CI scale.
or
Draw 0.01010011 of BIN C under the hairline.
Read the reciprocal $(11.00010101)_2$ at the hairline on the BIN CI scale.

EXAMPLE 17
Evaluate:
$$\begin{bmatrix}\frac{1001 \times 1011 \times 1110}{1010 \times 1100}\end{bmatrix}_2 =$$
Solution: Push hairline to 1001 on BIN D.
Draw 1010 of BIN C under the hairline.
Push hairline to 1011 on BIN C.
Draw 1100 of BIN C under the hairline.
Push hairline to 1110 on BIN C.
At the hairline read 1011100011 on BIN D.
To determine the position of the binary point write
$$\begin{bmatrix}\frac{1000 \times 1100 \times 1110}{1000 \times 1100}\end{bmatrix}_2 = \text{about } (1110)_2$$
Hence, the answer is $(1011.100011)_2$.

EXAMPLE 18
Evaluate: $(1.001 \times 111 \times 1.01 \times 0.11 \times 101.1)_2$
Solution: In order to solve this on the slide rule in the shortest possible way, rewrite the given expression in the form:
$$\begin{bmatrix}\frac{1.001 \times 1.01 \times 101.1}{(1/111) \times (1/0.11)}\end{bmatrix}_2$$
Push hairline to 1001 on BIN D.
Draw 111 of BIN CI under the hairline.
Push the hairline to 101 on BIN C. Draw 11 of BIN CI under the hairline. Push hairline to 1011 on BIN C. At the hairline read 1010001001 on BIN D. To approximate the answer write $(1 \times 111 \times 1 \times 1 \times 111)_2 = (110,000)_2$.
Hence, the answer is $(101,000.1001)_2$.

The following set of examples illustrate duodecimal multiplication, duodecimal division, and the determination of reciprocals of duodecimal numbers.

EXAMPLE 19
Evaluate: $(9.B7)_{12} \times (5.A)_{12}$
Solution: Disregard the duodecimal point and to 9B7 on DUODEC D, set the right index of DUODEC C.
Push hairline to 5A on DUODEC C.
At the hairline read 4A1 on DUODEC D.
To place the duodecimal point, approximate the answer by writing $(A)_{12} \times (6)_{12} = (50)_{12}$.
Hence, the answer is $(4A.1)_{12}$.

EXAMPLE 20
Evaluate: $(1A.B)_{12} (B.A)_{12}$
Solution: Disregard the duodecimal point and push the hairline to 1AB on DUODEC D.
Draw BA OF DUODEC C under the hairline.
Opposite index of DUODEC C read 1B3 on DUODEC D.
The rough calculation $(1B)_{12} (10)_{12} = (1.B)_{12}$ shows that the duodecimal point must be placed after the 1. Hence, the answer is $(1.B3)_{12}$.

EXAMPLE 21
Evaluate: $\begin{bmatrix}\frac{5.27}{3.15}\end{bmatrix}_{12} = \begin{bmatrix}\frac{4.35}{x}\end{bmatrix}_{12} = \begin{bmatrix}\frac{y}{41.6}\end{bmatrix}_{12} = \begin{bmatrix}\frac{1BA.0}{z}\end{bmatrix}_{12}$ Solution: Push hairline to 527 on DUODEC D.
Draw 315 of DUODEC C under the hairline.
Opposite 435 on DUODEC D, read $x = (2.68)_{12}$ on DUODEC C.
Opposite 416 on DUODEC C, read $y = (6A.9)_{12}$ on DUODEC D.
Opposite 1BA0 on DUODEC D, read $z = (123)_{12}$ on DUODEC C. The positions of the duodecimal points were determined by noticing that each denominator had to be somewhat less than twice its associated numerator because 5.27 is somewhat less than twice 3.15.

EXAMPLE 22
Find the reciprocal of: $(0.0BA)_{12}$
Solution: Draw 0.0BA of DUODEC CI under the hairline.
Read the reciprocal $(10.2)_{12}$ at the hairline on the DUODEC C scale.
or
Draw 0.0BA of DUODEC C under the hairline.
Read the reciprocal $(10.2)_{12}$ at the hairline on the DUODEC CI scale.

EXAMPLE 23
Evaluate: $\begin{bmatrix}\frac{17 \times 45 \times 37}{23 \times 27}\end{bmatrix}_{12}$ Solution: Push hairline to 17 on DUODEC D.
Draw 23 of DUODEC C under the hairline.
Push hairline to 45 on DUODEC C.
Draw 27 of DUODEC C under the hairline.
Push hairline to 37 on DUODEC C.
At the hairline read 437 on DUODEC D.
To determine the position of the duodecimal point write
$$\begin{bmatrix}\frac{20 \times 40 \times 40}{20 \times 30}\end{bmatrix} = \text{about } (54.0)_{12}$$
Hence, the answer is $(43.7)_{12}$.

EXAMPLE 24
Evaluate: $(1.743 \times 72 \times 2.45 \times 0.574 \times 225)_{12}$
Solution: In order to solve this on the slide rule in the shortest possible way, rewrite the given expression in the form:
$$\begin{bmatrix}\frac{1.743 \times 2.45 \times 225}{(1/72) \times (1/0.574)}\end{bmatrix}_{12}$$
Push hairline to 1743 on DUODEC D.
Draw 72 of DUODEC CI under the hairline.
Push hairline to 245 on DUODEC C.
Draw 574 of DUODEC CI under the hairline.

Push hairline to 225 on DUODEC C.

At the hairline read 242 on DUODEC D.

To approximate the answer write $(2 \times 70 \times 2 \times 0.6 \times 200)_{12}$ = $(24000)_{12}$.

Hence, the answer is $(24200)_{12}$.

As should now be apparent a new and improved analog computing device of slide rule type has been described in which calculations may be made in non-decimal number systems. While the invention, for definiteness, has been described in connection with a slide rule of the linear type, it is equally applicable to circular slide rules. In this case, for example, the binary C and D scales would be defined along a circular line with the beginning and ending indexes coincident.

While a particular embodiment of the invention have been shown and described, it will be obvious to those skilled in the art that changes and modifications may be made without departing from the invention in its broader aspects and, therefore, the aim in the appended claims is to cover all such changes and modifications as fall within the true scope of the invention.

What is claimed is:

1. An analog computing device of the slide rule type having two relatively movable members each of which has defined thereon a scale of from 1 to 10 in an other than decimal number system which scale is graduated in accordance with the logarithm to the base of said other than decimal number system and includes, at least, divisions for each digit of said other than decimal number system, whereby at least multiplication and division operations in said other than decimal number system may be carried out by the manipulation of the said relatively movable members.

2. The analog computing device of the slide rule type as defined in claim 1, wherein:

said other than decimal number system is the binary number system; and a third binary scale extending from 10 to 1, so as to be laid out in the inverse direction from said other binary scales, is defined upon one of said members whereby inverse binary numbers to said other binary scale's numbers may be read thereon.

3. The analog computing device of the slide rule type as defined in claim 1, wherein:

said other than decimal number system is the octal number system; and a third octal scale extending from 10 to 1, so as to be laid out in the inverse direction from said other octal scales, is defined upon one of said members whereby inverse octal numbers to said other octal scale's numbers may be read thereon.

4. The analog computing device of the slide rule type as defined in claim 1, wherein:

said other than decimal number system is the duodecimal number system; and a third duodecimal scale extending from 10 to 1, so as to be laid out in the inverse direction from said other duodecimal scales, is defined upon one of said members whereby inverse duodecimal numbers to said other duodecimal scale's numbers may be read thereon.

5. The analog computing device of the slide rule type as defined in claim 1, wherein:

said other than decimal number system is the hexadecimal number system; and a third hexadecimal scale extending from 10 to 1, so as to be laid out in the inverse direction from said other hexadecimal scales, is defined upon one of said members whereby inverse hexadecimal numbers to said other hexadecimal scale's numbers may be read thereon.

6. The analog computing device of the slide rule type as defined in claim 1, wherein:

said relatively movable members include a first body member and a slide member, a second body member rigidly affixed to said first body member is provided so that the slide member is slidably captivated between the first and second body members;

at least two additional scales as defined thereon, one scale being defined on the slide member and the other scale being defined on the second body member, each of said at least two additional scales being from 1 to 10 in a second other than decimal number system different from said non-decimal number system of said scale of said first body member, and each of said additional scales being graduated in accordance with the logarithm to the base of said second non-decimal number systems;

said additional scales and said first member scale being defined on the same surface of the device formed by said first body, second body and slide members;

each of said other than decimal number system scales have, at least, indicia for each of their digit divisions; and said scales are so laid out that the indicia of the two other than decimal number systems on said scales are upside down relative to one another.

7. The analog computing device of the slide rule type as defined in claim 6, wherein:

an additional two sets of scales are defined on the opposite surface from said same surface of the device, at least one of which sets of scales being defined from 1 to 10 in a third other than decimal number system different from the other than decimal number systems of said scales of said same surface, and graduated in accordance with the logarithm to the base of that third other than decimal number system;

each of said additional two sets of scales including at least one scale defined on said slide member and one scale defined on a different one of said first and said second body members.

8. The analog computing device of the slide rule type as defined in claim 7, wherein:

each of the scales of said additional two sets of scales have, at least indicia for each of their digit divisions; and said additional sets of scales are so laid out that the indicia of each of said two sets of scales is in an up-side-down relationship relative to the indicia of the other of said two sets of scales.

* * * * *

UNITED STATES PATENT OFFICE
CERTIFICATE OF CORRECTION

Patent No. 3,670,958     Dated June 20, 1972

Inventor(s) Svetislav M. Radosavljevic, et. al.

It is certified that error appears in the above-identified patent and that said Letters Patent are hereby corrected as shown below:

Column 5, line 20, between "$(67.5)_8$" and "$(37.7)_8$" insert -- $\div$ --; line 24, between "$(70)_8$" and "$(40)_8$" insert -- $\div$ --; line 28, change "$(\dfrac{Y}{41.6})_8$" to -- $(\dfrac{Y}{41.6})_8$ --. Column 6, line 21, between "$(1E.D)_{16}$" and "$(B.C)_{16}$" insert -- $\div$ --; . Column 6, line 26, between "$(20)_{16}$" and "$(C)_{16}$" insert -- $\div$ -- ; lines 31-32, change "$= \dfrac{1FA.0}{z}]_{16}$" to -- $= [\dfrac{1FA.0}{z}]_{16}$ --. Column 7, line 21, between "$(10.11100)_2$" and "$(10.110)_2$" insert -- $\div$ --; line 26, between "$(10.1)_2$" and "$(0.1)_2$" insert -- $\div$ --. Column 8, line 17, between "$(1A.B)_{12}$" and "$(B.A)_{12}$" insert -- $\div$ -- . Column 8, line 22, between "$(1B)_{12}$" and "$(10)_{12}$" insert -- $\div$ --.

Signed and sealed this 2nd day of January 1973.

(SEAL)
Attest:

EDWARD M. FLETCHER, JR.
Attesting Officer

ROBERT GOTTSCHALK
Commissioner of Patents